United States Patent
Baehrle-Miller et al.

(10) Patent No.: US 9,994,199 B2
(45) Date of Patent: Jun. 12, 2018

(54) METHOD FOR SECURING A VEHICLE AT A STANDSTILL

(71) Applicant: Robert Bosch GmbH, Stuttgart (DE)

(72) Inventors: Frank Baehrle-Miller, Schoenaich (DE); Dieter Blattert, Kirchheim/Neckar (DE)

(73) Assignee: Robert Bosch GmbH, Stuttgart (DE)

(*) Notice: Subject to any disclaimer, the term of this patent is extended or adjusted under 35 U.S.C. 154(b) by 42 days.

(21) Appl. No.: 15/178,932

(22) Filed: Jun. 10, 2016

(65) Prior Publication Data

US 2016/0362091 A1    Dec. 15, 2016

(30) Foreign Application Priority Data

Jun. 11, 2015 (DE) .................. 10 2015 210 678

(51) Int. Cl.
| | | |
|---|---|---|
| *B60T 1/00* | (2006.01) | |
| *B62D 5/04* | (2006.01) | |
| *B62D 6/00* | (2006.01) | |
| *B62D 7/20* | (2006.01) | |
| *B62D 9/00* | (2006.01) | |
| *B62D 17/00* | (2006.01) | |
| *B62D 15/02* | (2006.01) | |
| *B60T 13/74* | (2006.01) | |

(52) U.S. Cl.
CPC ............ *B60T 1/005* (2013.01); *B60T 13/741* (2013.01); *B62D 5/046* (2013.01); *B62D 6/00* (2013.01); *B62D 7/20* (2013.01); *B62D 9/00* (2013.01); *B62D 15/027* (2013.01); *B62D 17/00* (2013.01)

(58) Field of Classification Search
CPC ....... B60T 1/005; B60T 13/741; B62D 5/046; B62D 6/00; B62D 7/20; B62D 9/00; B62D 15/027; B62D 17/00
See application file for complete search history.

(56) References Cited

U.S. PATENT DOCUMENTS

| | | | | |
|---|---|---|---|---|
| 7,458,442 | B2* | 12/2008 | Kolberg | F16D 49/00 188/1.11 E |
| 7,946,397 | B2* | 5/2011 | Miller | F16D 65/18 188/106 P |
| 2003/0226727 | A1 | 12/2003 | Laurent | |
| 2005/0035653 | A1* | 2/2005 | Godlewsky | B60T 8/00 303/122.03 |
| 2007/0182242 | A1* | 8/2007 | Inagaki | B60T 7/047 303/3 |
| 2008/0087491 | A1* | 4/2008 | Ammon | B62D 5/008 180/426 |

(Continued)

FOREIGN PATENT DOCUMENTS

| | | |
|---|---|---|
| DE | 103 61 042 B3 | 5/2005 |
| DE | 10 2008 046 367 A1 | 3/2010 |

(Continued)

*Primary Examiner* — Calvin Cheung
(74) *Attorney, Agent, or Firm* — Maginot, Moore & Beck LLP

(57) ABSTRACT

A vehicle includes an electromechanical braking device having an electric brake motor, at least one wheel, and a steering actuator that is operable to adjust the at least one wheel. A method for securing the vehicle at a standstill includes applying brake force via the brake motor and actuating the steering actuator to adjust the at least one wheel.

10 Claims, 4 Drawing Sheets

(56) References Cited

U.S. PATENT DOCUMENTS

| | | | | |
|---|---|---|---|---|
| 2008/0162009 | A1* | 7/2008 | Miki | B60G 7/006 |
| | | | | 701/80 |
| 2009/0021196 | A1* | 1/2009 | Peyras | H02P 21/06 |
| | | | | 318/400.02 |
| 2012/0205202 | A1* | 8/2012 | Baehrle-Miller | B60T 13/588 |
| | | | | 188/106 P |
| 2013/0174647 | A1* | 7/2013 | Germann | B60T 17/221 |
| | | | | 73/39 |
| 2013/0226425 | A1* | 8/2013 | Oliveira | B60T 7/122 |
| | | | | 701/70 |

FOREIGN PATENT DOCUMENTS

| | | |
|---|---|---|
| DE | 10 2009 035 771 A1 | 3/2010 |
| DE | 10 2010 001 922 A1 | 8/2011 |
| DE | 10 2011 078 900 A1 | 1/2013 |
| WO | 2006/038309 A1 | 4/2006 |

* cited by examiner

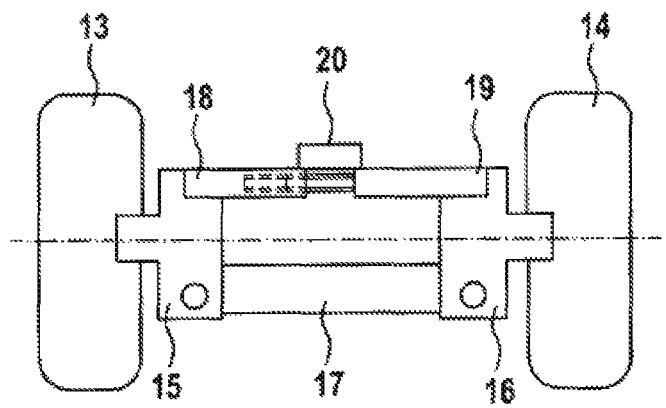
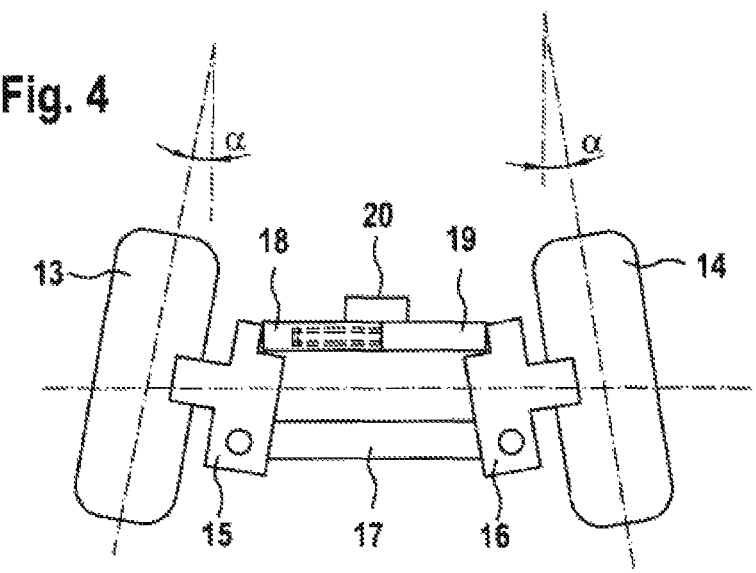

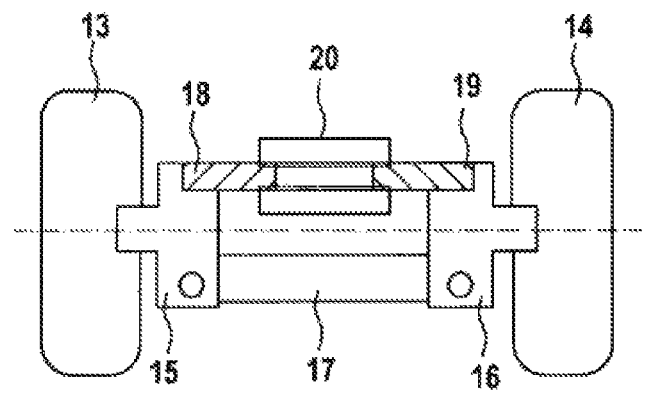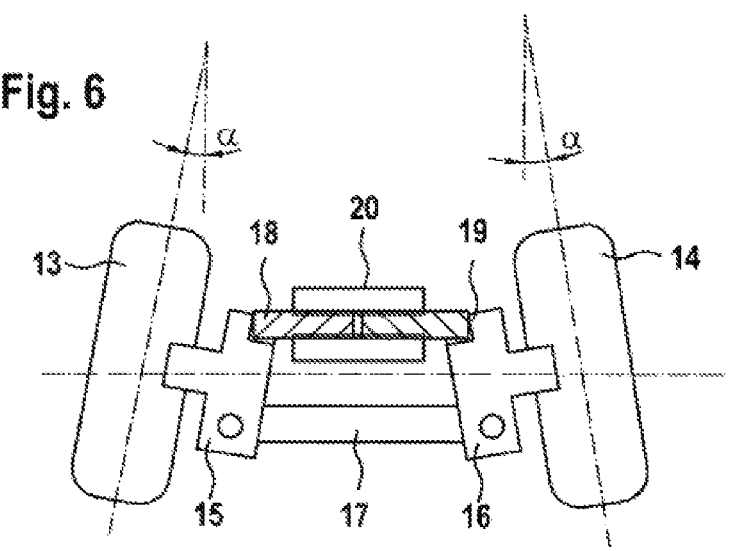

METHOD FOR SECURING A VEHICLE AT A STANDSTILL

This application claims priority under 35 U.S.C. § 119 to patent application no. DE 10 2015 210 678.0, filed on Jun. 11, 2015 in Germany, the disclosure of which is incorporated herein by reference in its entirety.

The disclosure relates to a method for securing a vehicle at a standstill, said vehicle comprising an electromechanical braking device having an electric brake motor.

BACKGROUND

Parking or holding brakes are known in vehicles, said brakes generating a brake application force that secures the vehicle at a standstill. The parking brake comprises an electric brake motor that pushes a brake piston that is the carrier of a brake pad axially against a brake disc. A parking brake of this type is described by way of example in DE 103 61 042 B3 and DE 10 2011 078 900 A1.

In the case of parking brakes, it is necessary to ensure that the brake application force that is required for holding the vehicle is also continuously provided after switching off the brake motor. Where appropriate, it is necessary to actuate the parking brake again after a defined time period has elapsed in order to compensate for a loss in brake application force owing to a thermal relaxation of braking components.

SUMMARY

The method in accordance with the disclosure relates to securing a vehicle at a standstill with the aid of an electromechanical braking device that is used as a holding brake or parking brake and comprises an electric brake motor that moves a brake piston against a brake disc so as to generate a brake application force. The rotational movement of the rotor of the movable brake motor is transferred into an axial adjusting movement of a spindle and the brake piston that is the carrier of a brake pad is pushed axially against the brake disc by way of said brake piston.

Where appropriate, the parking brake is integrated into the hydraulic vehicle brake and the hydraulic pressure of said hydraulic vehicle brake acts upon the brake piston.

In the case of the method for securing the vehicle at a standstill, in addition to the brake application force that is generated by way of actuating the electric brake motor, a braking force is generated by way of the steering system of the vehicle. For this purpose, a steering actuator that is a component of the steering system and by way of which it is possible to influence the position of at least one vehicle wheel is actuated in such a manner that the vehicle wheel position is adjusted and a lateral guidance force acts upon the vehicle wheel as an additional braking force. The change in position of the vehicle wheel consequently leads to the buildup of a lateral guidance force that acts when the vehicle is at a standstill and acts against the vehicle rolling forwards unintentionally from its position at a standstill.

This approach has the advantage that where appropriate it is possible to omit another actuation of the electric brake motor for re-applying and maintaining a desired brake application force. Even if a loss of brake application force occurs as a result of thermal relaxation after switching off the electric brake motor, the vehicle is held securely at a standstill by way of the lateral guidance force on the vehicle wheel that applies an additional braking force. Accordingly, the expenditure with regard to the control and actuation of the electric brake motor in order to continuously secure the vehicle at a standstill is reduced.

In addition, it is advantageous that the additional braking force that results from the lateral guidance force on the vehicle wheel is added to the brake application force that is generated by way of the electric brake motor. This renders it possible to use electromechanical braking devices or electric brake motors with smaller dimensions.

In accordance with an expedient embodiment, the steering actuator and the electric brake motor act upon the same vehicle wheel. In an alternative embodiment, in contrast the steering actuator and the electric brake motor act upon different vehicle wheels, in particular on different vehicle axles of the vehicle. By way of example, it can be expedient that the electromechanical braking device that is used as a vehicle parking brake is arranged on the rear wheels of a vehicle and acts upon the rear wheels, whereas the steering actuator adjusts the position of one or the two vehicle wheels on the front axle.

Adjusting the position of the vehicle wheel increases the lateral guidance force on this wheel with respect to the non-adjusted starting position. The adjustment of the position relates, in accordance with an advantageous embodiment, to the tracking of the vehicle wheel so that the toe angle of the wheel is changed with the influence of the steering actuator. The toe angle is the angle between the longitudinal axis of the vehicle, projected onto the road, and the sectional line between the wheel center plane and the road plane. The position of the vehicle wheel alters by way of altering the toe angle of the vehicle wheel with respect to the rolling direction of the vehicle forwards or rearwards, as a result of which the additional braking force is generated that results from the increased lateral guidance force on the vehicle wheel.

In accordance with a further advantageous embodiment, the position of the two vehicle wheels that are located on a common vehicle axle in the left-hand and right-hand side region are simultaneously adjusted by way of the steering actuator. Accordingly, an additional braking force is generated on the two vehicle wheels. In the case of an adjustment of the toe angle, the adjustment is preferably performed on two vehicle wheels in an identical manner, however in opposite directions. It can be expedient to provide a common steering actuator, said steering actuator adjusting in an identical manner steering track rods that point towards the vehicle wheels on the left-hand and right-hand side of the axle.

In the case of a toe-in that is applied to the vehicle wheels in the straight ahead position, the alteration of the toe angle is added to the toe-in. In a further expedient embodiment, the steering angle of the vehicle wheel is adjusted by way of the steering actuator. The steering actuator preferably engages in the steering system of the vehicle in such a manner that the steering angle is adjusted to the two steerable wheels on a common axle. The steering actuator is by way of example embodied as an electric servomotor and it is possible to supply a supporting torque into the steering system by way of said servomotor. It is possible to generate a sufficiently high torque by way of accordingly controlling the servomotor in order to adjust the steerable wheels at low speed or when the vehicle is at a standstill. The adjustment is preferably performed in such a manner that the vehicle wheel assumes an angle with respect to the downhill slope force in the event of the vehicle standing on an incline. If the vehicle is located on a planar surface, it can suffice to set a steering angle greater than zero in relation to the neutral starting position in the one or the other steering angle direction in order to produce an additional braking force by way of the lateral guidance forces at the vehicle wheels.

In accordance with a further expedient embodiment, it can also be expedient to adjust both the steering angle of the vehicle wheel by way of a steering actuator as well as the toe angle on at least one vehicle wheel by way of a further steering actuator. Embodiments in which the toe angle of the wheels that are steered are adjusted as well as embodiments in which the toe angle of the wheels that can not be steered are adjusted are both possible.

In accordance with a further expedient embodiment, the steering actuator and the electric brake motor are actuated in a chronological manner one after the other. By way of example, it can be expedient to initially actuate the electric brake motor during a parking procedure in order to generate a brake application force by way of said motor and to only also actuate the steering actuator after commencing the brake application procedure to generate the brake application force by way of the brake motor, in order to set an additional braking force by way of the lateral guidance force on the vehicle wheel. It is also possible to actuate the steering actuator both after the vehicle is at a standstill as well as also prior to the vehicle being at a standstill.

In an alternative embodiment, initially the steering actuator is actuated in order to produce a braking force by way of the lateral guidance force on the vehicle wheel, and only subsequently is the electric brake motor actuated so as to generate a brake application force. In this case, the steering actuator is further actuated when the vehicle is moving.

In a further alternative embodiment, the steering actuator and the electric brake motor are actuated simultaneously, in particular when the vehicle is still moving, where appropriate also only after the vehicle is at a standstill. In each case, it can be expedient to couple the actuation of the steering actuator to being below a speed threshold value that is in particular typical for a parking procedure and by way of example is approximately 10 km/h.

The different method steps are performed in the regulating and controlling device, which is by way of example the controlling device of the steering system. Adjusting signals are generated in the regulating or controlling device and the adjustable components of the braking system and the steering system are controlled by way of said adjusting signals.

The steering actuator is preferably an electric motor. If the steering angle of the vehicle wheel is adjusted by way of the steering actuator, the steering actuator is preferably embodied as an electric servomotor. Also in the case that the toe angle is adjusted by way of the steering actuator, the steering actuator is advantageously an electric motor.

In order to alter the toe angle, the steering actuator is advantageously located between two steering track rods on the left-hand and right-hand vehicle wheel of a common vehicle axle. In the case of an actuation of the steering actuator, the toe angle of the two wheels is simultaneously altered, in particular simultaneously decreased or increased.

In the case of setting the toe angle—when viewed from above—a V-shape of the vehicle wheels is set. Both embodiments are taken into account, in which the V peak points in relation to the vehicle forward direction as well as also embodiments in which the V peak points to the rear.

BRIEF DESCRIPTION OF THE DRAWINGS

Further advantages and expedient embodiments are evident in the further claims, the description of the figures and the drawings. In the drawings:

FIG. 3 illustrates a plan view of two wheels of a vehicle axle having a tracking adjusting device, illustrated in the starting position, FIG. 4 illustrates the wheels of the vehicle axle in accordance with FIG. 3 having an adjusted toe angle, FIG. 5, 6 illustrate one of the illustrations that correspond to FIGS. 3 and 4 of two vehicle wheels having a tracking adjusting device in a further embodiment, FIG. 7, 8 illustrate two vehicle wheels having a tracking adjusting device in a yet further embodiment.

In the figures, identical components are provided with identical reference numerals.

DETAILED DESCRIPTION

Figure 1:
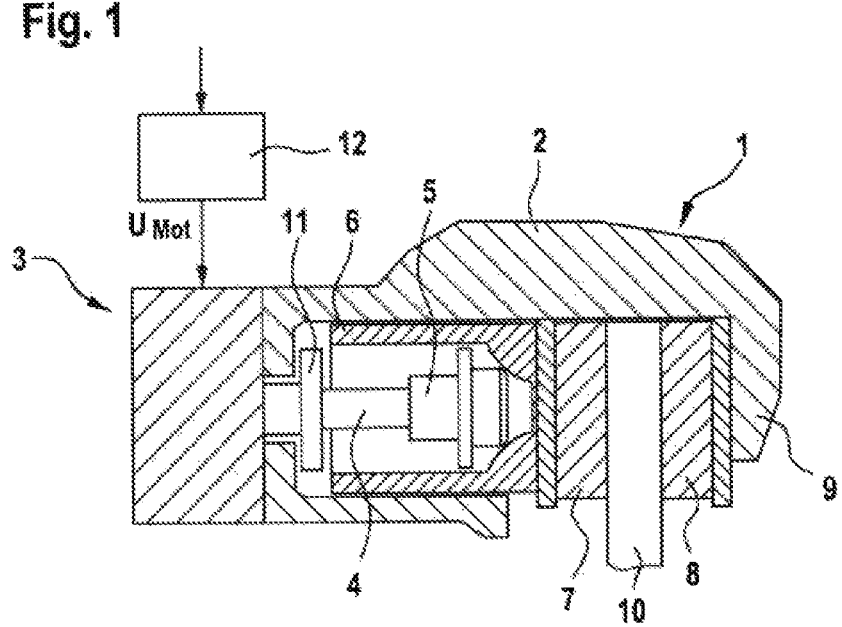
FIG. 1 illustrates a section through an electromechanical braking device that is used as a parking brake in a vehicle and in which it is possible to generate the brake application force by way of an electric brake motor.

FIG. 1 illustrates an electromechanical parking brake 1 for securing a vehicle at a standstill. The parking brake 1 comprises a brake caliper 2 having a set of jaws 9 that grip over a brake disc 10. As an adjusting member, the parking brake 1 comprises a DC electric motor as a brake motor 3 whose rotor shaft drives a spindle 4 in a rotating manner and a spindle nut 5 is mounted on said spindle in such a manner that it can rotate. In the case of a rotation of the spindle 4, the spindle nut 5 is adjusted in an axial manner. The spindle nut 5 moves within a brake piston 6 that is the carrier for a brake pad 7 that is pushed by the brake piston 6 against the brake disc 10. A further brake pad 8 is located on the opposite-lying side of the brake disc 10, said brake pad being held on the set of jaws 9 in such a manner that it can not move.

In the case of a rotational movement of the spindle 4, the spindle nut 5 can move within the brake piston 6 axially forwards in the direction of the brake disc 10 or in the case of a rotational movement of the spindle 4 in the opposite direction the spindle 4 can move axially towards the rear until reaching a stop 11. The spindle nut 5 influences the inner end face of the brake piston 6 so as to generate a brake application force, as a result of which the brake piston 6 that is mounted in the parking brake 1 can be displaced axially and is pressed with the brake pad 7 against the front end surface of the brake disc 10.

The brake motor 3 is controlled by a regulating or controlling device 12 that is part of the parking brake system having the parking brake 1. The regulating or controlling device 12 provides as an output a supply voltage with which the electric brake motor 3 is influenced. A motor voltage $U_{Mot}$ is set in the brake motor.

The parking brake can be supported if required by a hydraulic vehicle brake so that the brake application force is combined from an electromechanical portion and a hydraulic portion. In the case of the hydraulic support, the rear side of the brake piston 6 that faces the brake motor is influenced with hydraulic fluid that is under pressure.

Figure 2:
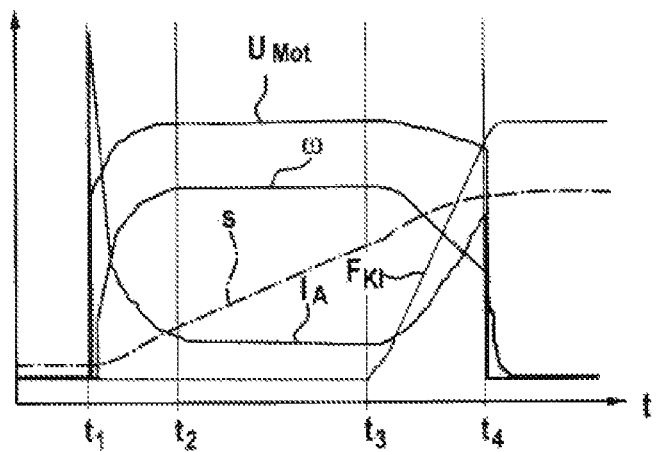
FIG. 2 illustrates a chart with the time-dependent curve of the motor voltage, the motor current, the motor rotational speed and the brake application force during the brake application procedure of the electric brake motor.

FIG. 2 illustrates a chart with the current curve $I_A$, the motor voltage $U_{Mot}$ and the curve of the motor angular velocity w of the electric brake motor in dependence upon time for a brake application procedure. Furthermore, the electromechanical brake application force $F_{KI}$ is plotted in FIG. 2, said brake application force being generated by the electric brake motor, and also the path s that is covered during the brake application procedure by the brake motor or by an adjusting member that is influenced by the brake motor is also plotted.

The brake application procedure starts at the point in time t1, the point at which an electrical voltage is applied and the brake motor is supplied with current in the case of a closed current circuit. The start phase (phase I) continues from the point in time t1 until the point in time t2. At the point in time t2, the motor voltage $U_{Mot}$ and the motor angle speed $\omega$ achieves its maximum. The phase between t2 and t3 represents the idle running phase (phase II) in which the current $I_A$ moves to a minimum level. After that point, the point in time t3, the buildup of force phase (phase III) takes place until the point in time t4 at which the brake pads lie on the brake disc and are pressed with increasing brake application force $F_{KI}$ against the brake disc. At the point in time t4, the electric brake motor is disconnected by means of opening the current circuit so that in the further curve, angle speed $\omega$ of the brake motor drops to zero.

The phase of the build-up of force at the point in time t3 coincides with the point at which the force increases. The build-up of force or the curve of the brake application force $F_{KI}$ can be determined by way of example with reference to the curve of the current $I_A$ of the brake motor that fundamentally comprises the same curve as the electromechanical braking force $F_{KI}$. Starting from the low level during the idle running phase between t2 and t3, the current curve $I_A$ increases sharply at the beginning of the point in time t3. This increase of the current can be detected and can be drawn upon so as to determine the point at which the force increases. Fundamentally, the curve of the build-up of force can however also be determined from the voltage curve or rotational speed curve or from an arbitrary combination of the signals: current, voltage and rotational speed.

The electromechanical braking device 1 is actuated as a parking brake so as to secure the vehicle at a standstill. In addition, a braking force is generated by virtue of the fact that the toe angle is adjusted at two wheels of a common axle, as a result of which the lateral guidance force is increased at each wheel, which leads to the desired increase in the braking force at each vehicle wheel.

FIGS. 3 to 8 illustrate various exemplary embodiments for a tracking adjusting device having a steering actuator 20.

In the first exemplary embodiment in accordance with the FIGS. 3 and 4, the tracking adjusting device comprises two steering track rods 18 and 19 that are embodied as threaded rods and engage in one another with an inner and an outer thread, wherein it is possible by virtue of rotating the threaded rods to alter the spacing between the engagement points of the threaded rods 18, 19 on the opposite lying wheel suspensions 15, 16 of the vehicle wheels 13, 14. Furthermore, a steering actuator 20 that by way of example is embodied as an electric motor is associated with the tracking adjusting device and the screwing movement of the threaded rods 18, 19 is achieved by way of said steering actuator. Furthermore, the wheel suspensions 15, 16 are connected to one another by way of a transverse carrier 17 that is arranged spaced with respect to the threaded rods 18, 19.

In the case of actuating the steering actuator 20, the threaded rods 18, 19 are adjusted into the position that is illustrated in FIG. 4 starting from the starting position in accordance with FIG. 3 in which no toe angle prevails at the vehicle wheels 13, 14. The threaded rods 18, 19 are rotated into one another so that the spacing between the wheel suspensions 15 and 16 is decreased at the engagement points of the threaded rods 18, 19. Furthermore, in each case a toe angle $\alpha$ is set at the vehicle wheels 13 and 14 in relation to the longitudinal axis of the vehicle. By means of the inclined position of the vehicle wheels 13, 14 that assume a V-position, said wheels build-up a lateral guidance force when the vehicle is at a standstill or is travelling at low speeds and an additional braking force on the vehicle wheels results from said lateral guiding force.

The recorded toe angle $\alpha$ relates to the central starting position of the vehicle wheels 13, 14 without a steering angle. A toe-in setting is also possible in which a toe angle is already applied to the vehicle wheels 13, 14 in the neutral starting position. In addition to the toe-in angle, a desired toe angle $\alpha$ can also be applied by way of actuating the steering actuator 20.

A further exemplary embodiment is illustrated in the FIGS. 5 and 6 in which the tracking adjusting device comprises two steering track rods 18 and 19 so as to set the toe angle a at the vehicle wheels 13 and 14, said steering track rods being coupled by way of a steering actuator 20. The steering actuator 20 comprises a threaded nut between the steering track rods 18 and 19 that are embodied as threaded rods and also an electric motor for generating a rotational movement of the threaded nut 20 as a result of which the desired spacing alteration is caused between the engagement points of the steering track rods 18 and 19 at the wheel suspensions 15 or 16 of each vehicle wheel 13, 14.

Figure 7:
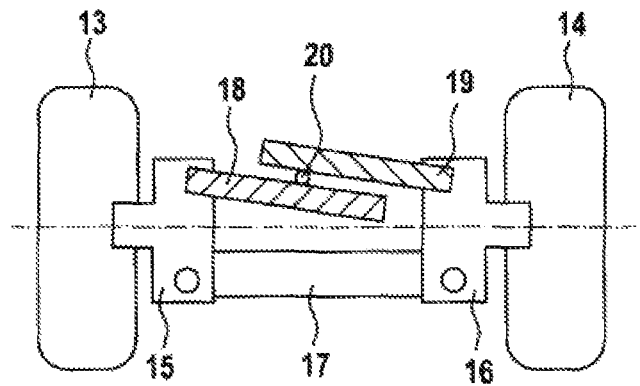
Figure 8:
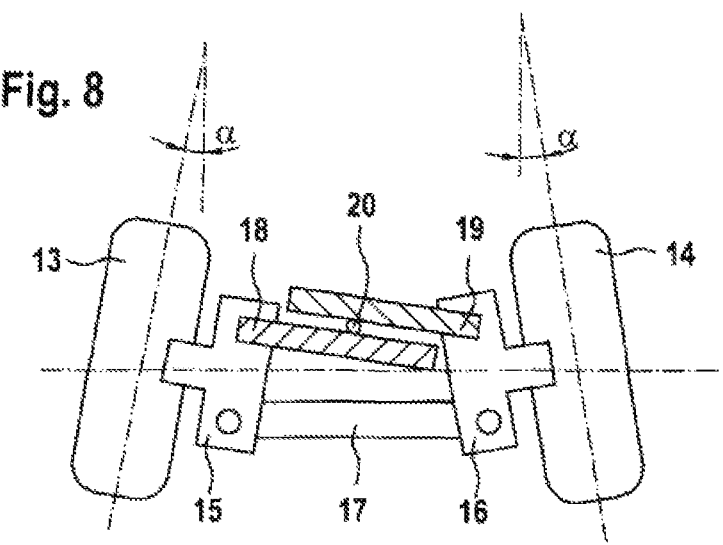

In the exemplary embodiment in accordance with FIGS. 7 and 8, the steering track rods 18 and 19 in each case are embodied as steering racks and a gear 20 is arranged between said steering racks, said gear being driven by a steering actuator. The relative position between the steering track rods 18 and 19 subsequently changes, as a result of which the spacing between the engagement points of the steering track rods 18, 19 are altered in a desired manner at the wheel suspensions 15, 16.

What is claimed is:

1. A method of securing a vehicle at a standstill, the vehicle including an electromechanical braking device with an electric brake motor that moves a brake piston against a brake disk to generate a brake application force, the method comprising:
    actuating the electric brake motor to generate the brake application force; and
    actuating a steering actuator to adjust a position of at least one vehicle wheel such that a lateral guiding force acts on the at least one vehicle wheel as an additional braking force,
    wherein the steering actuator is configured to adjust a steering angle of the at least one vehicle wheel, and
    wherein the steering actuator includes an electric servomotor.

2. The method of claim 1, wherein the electric brake motor and the steering actuator are each configured to act upon a same vehicle wheel.

3. The method of claim 1, further comprising:
    adjusting a tracking of the at least one vehicle wheel via the steering actuator.

4. The method of claim 1, the method comprising:
    adjusting a position of two opposite-lying vehicle wheels on a same vehicle axle via a common steering actuator.

5. The method of claim 1, further comprising:
    adjusting the steering angle of the at least one vehicle wheel such that the at least one vehicle wheel assumes an angle with respect to a down-hill slope force.

6. The method of claim 1, wherein the steering actuator and the electric brake motor are actuated chronologically one after the other.

7. The method of claim 1, wherein the steering actuator and the electric brake motor are actuated simultaneously.

8. A vehicle, comprising:
   a braking system that includes an electromechanical braking device having an electric brake motor;
   a steering actuator configured to adjust a positon of at least one vehicle wheel; and
   at least one device configured to at least one of regulate and control the braking system and the steering actuator,
   wherein actuation of the steering actuator enables adjustment of a toe angle of two opposite-lying vehicle wheels on a same vehicle axle, and
   further comprising:
      a respective steering track rod on each of a left-hand wheel and right-hand vehicle wheel of a vehicle axle,
      wherein the steering actuator is arranged between the steering track rods and is operable to adjust the steering track rods.

9. A method of securing a vehicle at a standstill, the vehicle including an electromechanical braking device with an electric brake motor that moves a brake piston against a brake disk to generate a brake application force, the method comprising:
   actuating the electric brake motor to generate the brake application force; and
   actuating a steering actuator to adjust a position of at least one vehicle wheel such that a lateral guiding force acts on the at least one vehicle wheel as an additional braking force,
   wherein the steering actuator and the electric brake motor are actuated chronologically one after the other.

10. A method of securing a vehicle at a standstill, the vehicle including an electromechanical parking braking device with an electric brake motor that moves a brake piston against a brake disk to generate a brake application force, the method comprising:
   actuating the electric brake motor while the vehicle is at a standstill to generate the brake application force; and
   actuating a steering actuator while the vehicle is at a standstill to adjust a position of at least one vehicle wheel such that a lateral guiding force acts on the at least one vehicle wheel as an additional braking force.

* * * * *